United States Patent [19]
Shimotori

[11] Patent Number: 5,585,578
[45] Date of Patent: Dec. 17, 1996

[54] STRUCTURE OF AN OPERATIVE PART OF A ROTATING MEMBER

[75] Inventor: Yasuzo Shimotori, Nagano, Japan

[73] Assignee: Kabushiki Kaisha Sankyo Seiki Seisakusho, Nagano, Japan

[21] Appl. No.: 417,129

[22] Filed: Apr. 5, 1995

[30] Foreign Application Priority Data

Apr. 6, 1994 [JP] Japan .................................. 6-093724

[51] Int. Cl.⁶ ...................................................... G10F 1/06
[52] U.S. Cl. .............................. 84/95.2; 16/125; 74/543; 74/557
[58] Field of Search .................................. 84/94.2, 95.2; 16/112, 125, 126; 74/543, 557

[56] References Cited

U.S. PATENT DOCUMENTS 2,798,404   6/1953   Shcaefer et al. ............................... 85/9

Primary Examiner—Patrick J. Stanzione
Attorney, Agent, or Firm—Sughrue, Mion, Zinn, Macpeak & Seas

[57] ABSTRACT

An elastic rubber piece is set in a through-hole formed in a connecting member in such a manner that it is clamped by the protruded portions of a handle member. The elastic rubber piece, being held between the end faces of the protruded portions, is deformed and brought into contact with the inner surface of the through-hole. The handle member is so set that it is swingable about the axis of the through-hole of the connecting member.

10 Claims, 4 Drawing Sheets

FIG. 4(a)
PRIOR ART
FIG. 4(b)
PRIOR ART
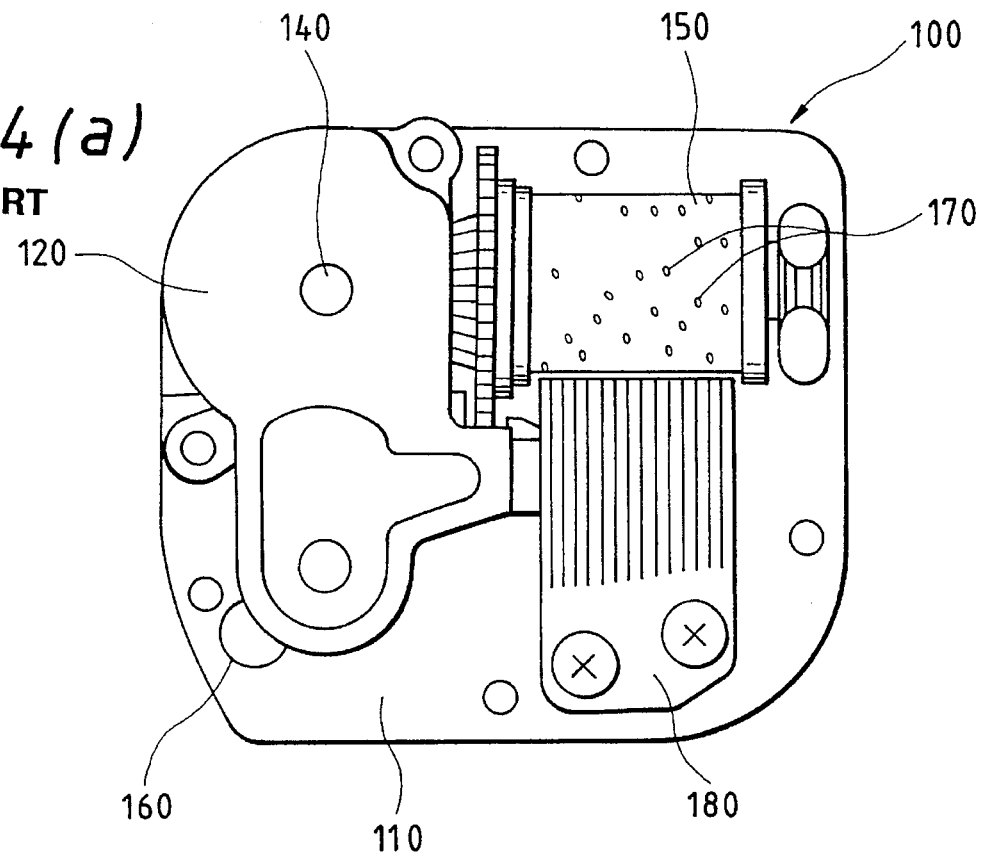
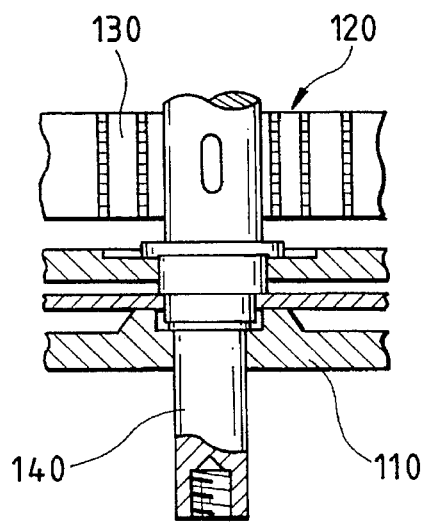

STRUCTURE OF AN OPERATIVE PART OF A ROTATING MEMBER

BACKGROUND OF THE INVENTION

1. Field of the Invention

This invention relates to the structures of operative parts of rotating members, and more particularly to the structure of an operative part of a rotating member which is suitable for a winding key which is formed at the end of a spring winding shaft, such as in a music box.

2. Related Art

A rotating operation member is used for a winding key formed on the end portion of a spring winding shaft.

For example, as shown in FIGS. 4 (a) and (b), a power spring 130 fixed in a box 120 is wound around a winding member 140 so that the power spring 130 serves as a power source for driving a speed governor to adjust the speed of a rotating dram 150. A plurality of pins 170 repel a respective plurality of vibration plates to produce music. A winding key is screwed to a lower end portion of the winding member 140.

A conventional winding key adapted to wind a spring, such as in a musical box, is shown in FIG. 3 (a). The key includes a connecting member 41, and a handle member 5 which is engaged with a through-hole 41 formed in one end portion of the connecting member 4. The handle member 5 includes an arcuate knob portion 51 for turning the handle member and the connecting member to which the handle is connected, a pair of bent portions 54 and 55 which are extended from both ends of the arcuate knob 51 and bent inwardly, and a pair of protruded portions 52 and 53 which are formed at the ends of the bent portions 54 and 55 in such a manner that they are extended towards each other. The protruded portions 52 and 53 are fitted in respective end openings 42 and 43 of the through-hole 41 in the connecting member 4, so that the handle member 5 is coupled to the connecting member 4 in such a manner that it is swingable about the common central axis of the protruded portions 52 and 53. The other end portion of the connecting member 4 includes a threaded portion 44 which is engaged with a spring winding shaft.

When the winding key is not used, the knob portion 51 is swung over the side surface of the spring winding shaft. Hence, before the winding key is operated, the knob portion 51 is swung back in line with the axis of the spring winding shaft. The knob portion 51 is then turned around the axis of the spring winding shaft to wind the spring.

In the above-described conventional winding key, the connecting member 4 and the handle member 5 are in contact with each other through the edges of the openings of the through-hole 41 and the flanges which are formed around the protruded portions. Since the contact parts of members 4 and 5 are considerably unstable in contact pressure, the handle member 5 may not be smoothly turned, which can result in an injury to the operator's fingers and/or excessive vibration noise. Furthermore, the torque required for swinging the handle member 5 (hereinafter referred to as "swing torque") may not be consistent from one key to the next, some of the components may have different dimensions when manufactured. In other words, different winding keys may have different swing torques. In addition, the torque may vary depending on the angle of swing of the handle member because of dimensional errors of in machining the components. When the winding key is used frequently, the contact parts of the connecting member 4 and the handle member 5 are worn and deformed, which results in an increase in contact pressure. If the contact parts are non-uniformly worn, it may become difficult or impossible to swing the handle member from one position to another.

For instance, in the case as shown in FIG. 3 (b), the periphery 43a of the opening of the connecting member 4 is variable in height in a circumferential direction, and the contact pressure changes depending on the difference d in height. This makes it impossible to smoothly swing the handle member 5. In the case shown in FIG. 3 (c), where the periphery 43a' of the opening is in contact with the handle member 5 through an edge F, the contact parts are severely worn as the winding key is used.

SUMMARY OF THE INVENTION

In view of the foregoing, an object of the invention is to provide a structure for the rotating member which is suitable for a winding key and in which the handle member can be smoothly swung, a variation in swing torque of the handle member is minimized, and a variation in swing torque due to the wear of the contact parts is also prevented.

According to one aspect of the present invention, there is provided a rotating member which includes a rotating operation member that is rotatably supported, a pair of engaged portions formed on side end surfaces, respectively, a handle member having a pair of engaging portions rotatably engaged with the engaged portions, respectively, in such a manner that the handle member rotates about a rotation axis perpendicular to a rotation axis of the rotating operation member; and an elastic member pressingly held between the engaging portion of the handle member and the engaged portion of the rotating operation member.

As was described above, according to the invention, the engaged portion of the rotating member and the engaging portion of the handle member are coupled through the elastic member to each other; that is, the engaged portion and the engaging portion are elastically coupled to each other while stably contacting the elastic member, so that their contact pressure remains relatively constant, and accordingly the swing torque of the handle member is less variable. In addition, the elasticity of the engaging portion contributes to protection of the operator's fingers or the like, and to suppression of vibration noise. In addition, the rotating member and the handle member do not require direct contact part, i.e., they are not in direct contact. Even if the rotating member and the handle member are indirect contact, the contact pressure is reduced, so that deformation due to wear is also reduced.

BRIEF DESCRIPTION OF THE DRAWINGS

FIG. 2 (b) a sectional view showing the structure of a third embodiment of the invention.

FIG. 3 (b) is an enlarged sectional view showing the engagement of an example of a connecting member and a handle member;

FIG. 3 (c) is also an enlarged sectional view showing the engagement of another example of the connecting member and the handle member; and FIGS. 4 (a) and (b) are plan and side views of a general structure of a music box.

DETAILED DESCRIPTION OF THE PREFERRED EMBODIMENTS

Figure 1A:
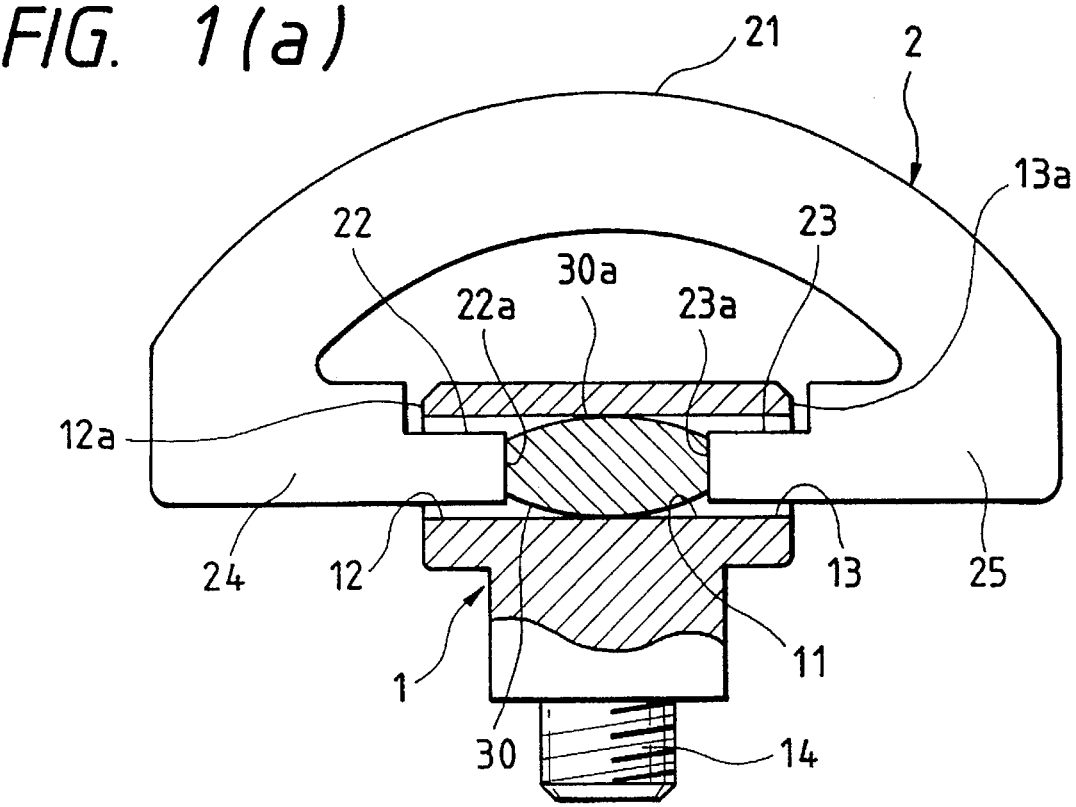
FIGS. 1 (a) and (b) are a front view, partially in section, and a side view, respectively, showing the structure of a first embodiment of the invention.
Figure 1B:
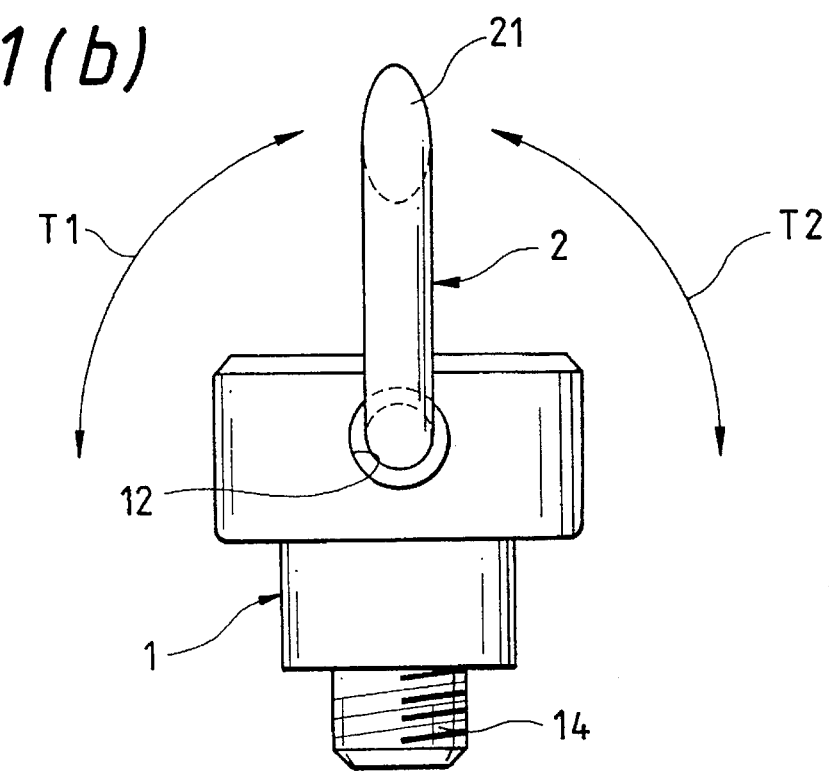

An example of the structure of an operative part of a rotating member (such as for a winding key), which constitutes a first embodiment of the invention, will be described with reference to FIGS. 1 (a) and (b). As shown in FIG. 1 (a), a connecting member 1 includes a front end portion having a through-hole 11, and a rear end portion including a threaded portion 14. The axis of the through-hole 11 is perpendicular to the axis of rotation of the connecting member 1. A handle member 2 includes an arcuate knob portion 21, a pair of bent portions 24 and 25 which are extended from both ends of the arcuate knob portion 21, and a pair of protruded portions 22 and 23 which are formed at the ends of the bent portions 54 and 55 so that they extend towards each other. The protruded portions 22 and 23 are inserted into the respective end openings 12 and 13 of the through-hole 11, respectively. An elastic rubber piece 30, which is substantially in the form of a cylinder, is disposed in the through-hole 11 in such a manner that it is pressed with the protruded portions 22 and 23 from both sides.

In the first embodiment, the peripheries 12a and 13a of the openings of the connecting member 1 are not in contact with the handle member 2; that is, the connecting member 1 is coupled to the handle member 2 via the elastic rubber piece 30. The elastic rubber piece 30, being in contact with the end faces 22a and 23a of the protruded portions 22 and 23, is pressed from both sides, and it is deformed in the shape of a barrel. That is, the protruded portions 22 and 23 press the inner surface of the through-hole 11 through the cylindrical surface 30a of the elastic rubber piece 30. In the winding key, as shown in FIG. 1 (b) the handle member 2 is swingable about the axis of the through-hole 11 in the direction indicated by the arrows T1 and T2. The handle member 2 is swung together with the elastic rubber piece 30, or only the handle member 2 is swung, depending on the following factors: the forces of depression of the protruded portions 22 and 23, the elastic modulus of the elastic rubber piece 30, the friction coefficient of the elastic rubber piece 30 with respect to the end faces 22a and 23a of the protruded portions 22 and 23, the friction coefficient of the elastic rubber piece 30 with respect to the inner surface of the through-hole 11, the contact area of the elastic rubber piece 30 with respect to the end faces 22a and 23a, and the contact area of the elastic rubber piece 30 with respect to the inner surface of the through-hole 11.

In the above-described first embodiment, the connecting member 1 is not directly in contact with the handle member 2. Hence, the swing torque will not be affected by the configuration of the contact parts of the two members 1 and 2. Even if the end faces 22a and 23a of the protruded portions 22 and 23 and the inner surface of the through-hole 11 are changed in configuration, the contact parts of the connecting member 1 and the elastic rubber piece 30, and the contact parts of the handle member 2 and the elastic rubber piece 30, are affected relatively little or not at all in contact resistance due to the elasticity of the elastic rubber piece 30. Further, the swing torque is stable, and it is less variable when the handle member is swung. Due to this stable swing torque, the winding key of the invention, when compared with the conventional one, does not have the problem that different handle members have different swing torques, or a swing torque that changes with the swing angle.

Since the connecting member 1 is coupled through the elastic rubber piece 30 to the handle member, the member 1 and rubber piece 30 are coupled with flexibility. This feature eliminates the problem that the operator's fingers are injured by being caught by the handle member, and reduces vibration noise.

The connecting member 1 and the handle member 2 have no direct contact parts, which prevents the wear of these members. Even if the contact parts of members 1 and 2, which are in contact with the elastic rubber piece 30, are worn through repeated use of the winding key, the change in configuration of these members is absorbed by the elasticity of the elastic rubber piece 30. Accordingly, the variation in swing torque is much less than in the conventional device, and the handle member 2 is easily moved from one position to another. Even if the wear of the connecting member and the handle member is somewhat greater than normal, they can be used as they are merely by replacing the elastic rubber piece 30.

Figure 2A:
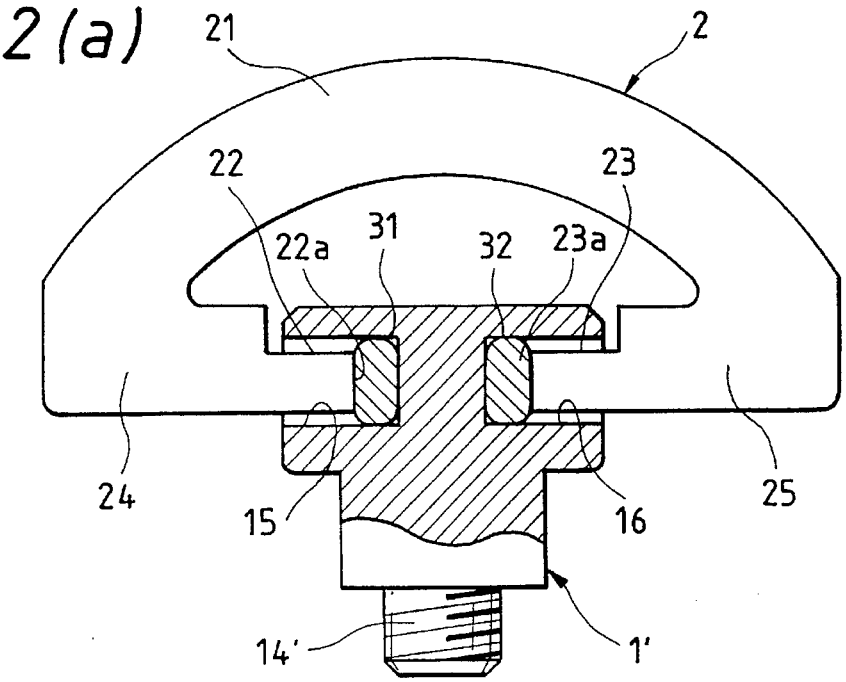
FIG. 2 (a) is a front view, partially in section, showing the structure of a second embodiment of the invention.
Figure 2B:
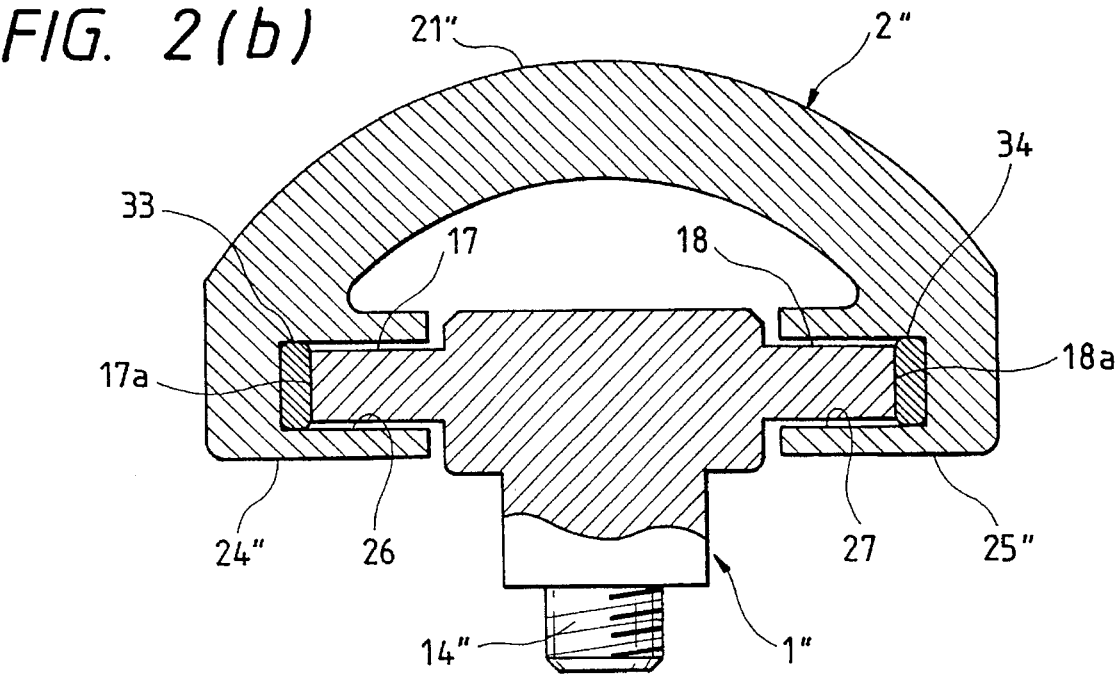
Figure 3A:
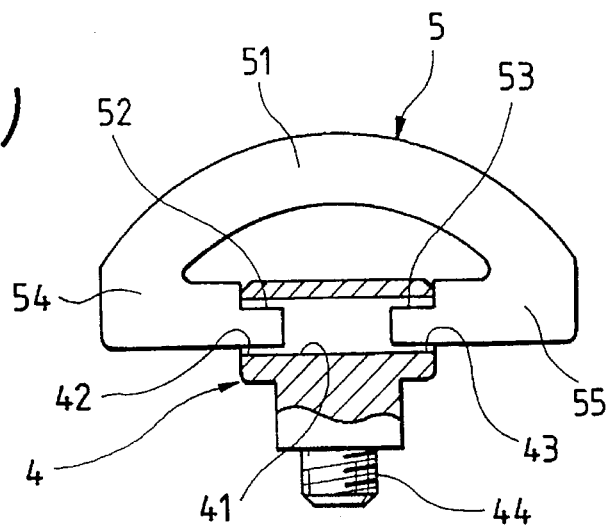
FIG. 3 (a) is a front view showing the structure of a conventional spring winding key.
Figure 3B:
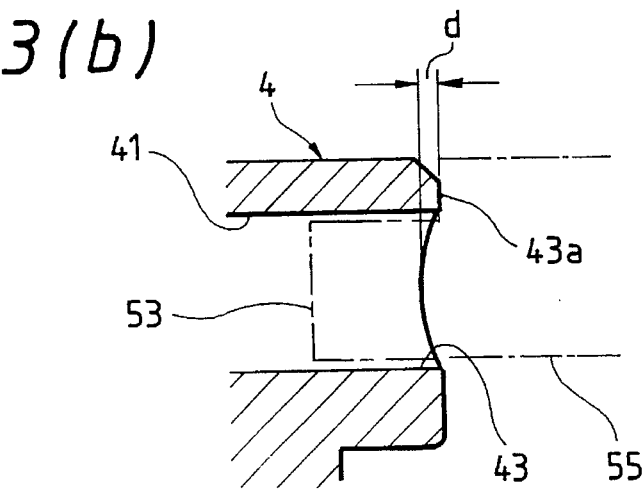
Figure 3C:
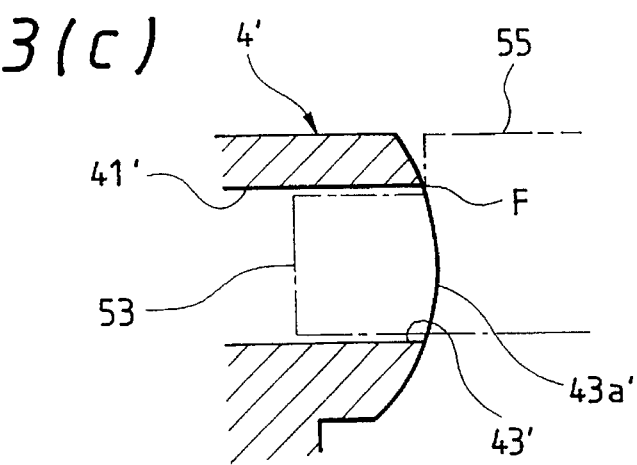

A second embodiment of the invention will be described with reference to FIG. 2 (a). The second embodiment has the same handle member 2 as the first embodiment. However, the former is different from the latter in that its connecting member 1' has a pair of round holes 15 and 16 formed in the cylindrical surface of its front end portion. The protruded portions 22 and 23 of the handle member 2 are inserted into the round holes 15 and 16, respectively, in such a manner that the end faces 22a and 23a of the protruded portions 22 and 23 push a pair of elastic rubber pieces 31 and 32 set in the round holes 15 and 16, respectively. The second embodiment in which the elastic rubber pieces 31 and 32 are held between the connecting member 1' and the handle member 2 in the above-described manner, has substantially the same advantageous effects as the first embodiment.

A third embodiment of the invention will be described with reference to FIG. 2 (b). In the third embodiment, the connecting member 1" has a pair of protruded shafts 17 and 18 extended outwardly from the cylindrical surface of its front end portion in such a manner that the shafts are on the same axis. The handle member 2" has round holes 26 and 27 formed respectively in its bent portions 24" and 25" and the protruded shafts 16 and 17 are inserted into the round holes 26 and 27, respectively, in such a manner that they push elastic rubber pieces 33 and 34. The third embodiment also has the same advantageous effects as the first and second embodiments.

In each of the above-described embodiments, the connecting member is not directly in contact with the handle member. However, even if these members are in contact with each other, the same effect can be obtained as long as the elastic rubber piece is pressed by the connecting member and the handle member. This arrangement is equivalent to the case where they are coupled through the elastic rubber piece to each other, and is within the scope of the invention.

In the above-described embodiments, the connecting member is threadably engaged with the end portion of the spring winding shaft. However, the connecting member may to be the from of a spring winding shaft. Further, a variety of connecting members having different configurations may be employed as long as they are rotatable around an axis.

In each of the above-described embodiments, the elastic rubber piece is employed as an elastic member. However, an elastic member other than those made of synthetic rubber or natural rubber, such as for instance a coil spring, may be employed with the same effect as long as it is sufficiently high in elasticity and in frictional resistance. However, in order to obtain stable swing, torque with a simple structure, it is preferable that the elastic member is made of a material such as rubber which is deformable. The material of the elastic member should be suitably determined from the configurations and materials of the relevant components which are in contact with the elastic member, with its surface friction coefficient and elastic modulus being taken into account.

The handle member is not limited to an arcuate knob portion. Any handle member which has an engaging portion corresponding to an engaged portion of the rotating member, and which is designed so that the elastic member is held between the handle member and the rotating member, may be employed regardless of the configuration of the handle. In addition, the relation between the engaged portion and the engaging portion is not limited to what has been described above. Instead, it may be modified in various manners as long as the engaged and engaging portions are coupled through the elastic member to each other. In the above-described embodiments, the elastic member is held clamped between the engaging portion and the engaged portion. However, the invention is not limited in this regard. For example, the elastic member may be held by a part of one of these portions, such as the edge of a hole, or a stepped protrusion.

The arrangement of the rotating member, the handle member and the elastic member may be modified so that the engaging portion and the engaged portion are coupled to each other through the elastic member wound on the cylindrical surface of the engaging portion or the engaging portion. In this modification, the elastic member is held between the engaging portion and the engaged portion similarly as in the above-described embodiments. However, the modification is different from those embodiments in that the elastic member is not pushed in the direction of the axis of rotation. Instead, it is pushed in a direction perpendicular to the axis of rotation. Even when the engaging portion and the engaged portion are loosely engaged with each other, since the elastic member is not pushed in the direction of the axis of rotation, these portions are positively coupled to each other, and therefore the rotating member can be smoothly rotated.

As is apparent from the above description, the embodiments have a number of effects or merits. In addition, the connecting member and the handle member are not required to be machined to precise tolerances so that the manufacturing yield can be increased, and the manufacturing cost is greatly reduced.

As was described above, according to the invention, the engaged portion of the rotating member and the engaging portion of the handle member are coupled to each other through an elastic member, so that their contact pressure remains relatively constant, and the swing torque of the handle member is therefore less variable. In addition, the elasticity of the engaging portion contributes to protection of the operator's fingers or the like, and to suppression of vibration noise. In addition, the rotating member and the handle member do not need to be directly contacted. Even if the rotating member and the handle member are contacted, the contact pressure is reduced, so that deformation due to wear is also reduced.

What is claimed is:

1. A rotating member comprising:
    an operation member disposed for movement about a first axis of rotation, and having an engaged portion at one end of said operation member;
    a handle member having an engaging portion rotatably engaged with said engaged portion, said handle member being disposed for movement about a second axis of rotation at a predetermined angle with respect to said first axis of rotation; and
    an elastic member pressingly held between said engaging portion and said engaged portion.

2. The rotating member as claimed in claim 1, wherein said handle member squeezes said elastic member in a direction substantially parallel to said second axis of rotation.

3. The rotating member as claimed in claim 2, wherein the rotating member comprises a winding key, and wherein said operation member is connected to a spring winding shaft of a music box.

4. The rotating member as claimed in claim 1, wherein said engaged portion comprises a hole in said one end of said operation member.

5. The rotating member as claimed in claim 4, wherein the rotating member comprises a winding key, and wherein said operation member is connected to a spring winding shaft of a music box.

6. The rotating member as claimed in claim 4, wherein said hole is a through-hole that extends from one side surface of said operation member at said one end to an opposite side surface of said operation member at said one end.

7. The rotating member as claimed in claim 4, wherein said hole comprises two recesses at opposite side surfaces of said operation member at said one end.

8. The rotating member as claimed in claim 1, wherein the rotating member comprises a winding key, and wherein said operation member is connected to a spring winding shaft of a music box.

9. The rotating member as claimed in claim 1, wherein said predetermined angle is 90°.

10. The rotating member as claimed in claim 1, wherein said handle member comprises two bent portions, and said engaging portion comprises holes in ends of said bent portions.

* * * * *